United States Patent [19]

Shimamoto

[11] Patent Number: 4,563,046

[45] Date of Patent: Jan. 7, 1986

[54] FLYWHEEL APPARATUS

[75] Inventor: Yoshiharu Shimamoto, Yokohama, Japan

[73] Assignees: Kabushiki Kaisha Toshiba, Kawasaki; Director-General of National Aerospace Lab., Tokyo, both of Japan

[21] Appl. No.: 625,617

[22] Filed: Jun. 28, 1984

[30] Foreign Application Priority Data

Jun. 30, 1983 [JP] Japan .............................. 58-119313

[51] Int. Cl.⁴ ............................................ F16C 39/06
[52] U.S. Cl. ......................................... 308/10; 310/74
[58] Field of Search .................. 308/10; 244/165, 166; 310/74, 153; 74/572; 322/4

[56] References Cited

U.S. PATENT DOCUMENTS

| 3,845,995 | 11/1974 | Wehde | 308/10 |
| 3,955,858 | 3/1978 | Poubeau | 308/10 |
| 4,077,678 | 3/1978 | Studer | 308/10 |
| 4,211,452 | 7/1980 | Poubeau | 308/10 |
| 4,285,552 | 8/1981 | Sutter | 308/10 |
| 4,443,043 | 4/1984 | Yamaguchi | 308/10 |
| 4,483,570 | 11/1984 | Inoue | 308/10 |

FOREIGN PATENT DOCUMENTS

| 0049300 | 4/1982 | European Pat. Off. | 308/10 |
| 2842165 | 4/1980 | Fed. Rep. of Germany | 308/10 |
| 2257077 | 1/1975 | France | 308/10 |
| 2329890 | 5/1977 | France | 308/10 |
| 2384174 | 10/1978 | France | 308/10 |
| 2524090 | 9/1983 | France | 308/10 |
| 2033977 | 5/1980 | United Kingdom | 308/10 |

OTHER PUBLICATIONS

Patents Abstracts of Japan, vol. 6, No. 33 (M-114) [911], 27th Feb. 1982; & JP-A-56 147 942 (Tokyo Shibaura Denki K.K.) 17-11-1981.

Patents Abstracts of Japan, vol. 6, No. 142 (M-146) [1020], 31st Jul. 1982; & JP-A-57 65 443 (Tokyo Shibaura Denki K.K.) 21-04-1982.

Primary Examiner—R. Skudy
Attorney, Agent, or Firm—Oblon, Fisher, Spivak, McClelland & Maier

[57] ABSTRACT

A flywheel apparatus of the invention has a base and a rotor. The rotor is supported by a magnetic bearing. The magnetic bearing has a first annular plate member of a magnetic material, a second annular plate member of magnetic material radially opposing the first annular plate member so as to define a first annular gap, and at least two magnetic circuits formed between the first and second annular plate members as the first annular is a common magnetic path. The apparatus further includes solenoids for changing, at a plurality of positions along the circumferential direction of the first annular magnetic gap, the density of the magnetic fluxes passing along the common magnetic path.

12 Claims, 10 Drawing Figures

FLYWHEEL APPARATUS

BACKGROUND OF THE INVENTION

The present invention relates to a flywheel apparatus using a magnetic bearing and, more particularly, to a flywheel apparatus used for satellite attitude control, i.e., a reaction wheel of a magnetic bearing type.

Flywheel type actuators such as a momentum wheel or a reaction wheel are widely used for controlling the orientation of a satellite. Various types of such flywheel type actuators have already been developed.

The flywheel apparatus generally has a rotor and a motor for driving the rotor at high speed. In a flywheel apparatus of this type, the rotor is rotatably supported through ball bearing.

However, when a flywheel apparatus of the type using ball bearing is used for a flywheel type actuator for controlling satellite attitude, it is disadvantageous that the ball bearing must be lubricated as it wears over time since they are of the contact type. Because, any piece of equipment to be installed on a satellite must be maintenance-free and must have a semi-permanent life. For this reason, it is advantageous to use a magnetic bearing of a noncontact type as the rotor bearing of the flywheel apparatus used for satellite attitude control.

A satellite momentum wheel as described in U.S. Pat. No. 3,955,858 is known as a flywheel apparatus of the type which uses magnetic bearings of a noncontact type. In the magnetic bearings of this conventional satellite momentum wheel, the rotor is radially supported by an uncontrolled type of magnetic circuit or by a passive magnetic circuit utilizing a permanent magnet, and the rotor is axially supported by a controlled type of magnetic circuit or by an active magnetic circuit utilizing an electromagnet.

However, a flywheel apparatus using magnetic bearing of this type still has problems. In the type of magnetic bearing described above, the rotor is radially supported by the passive magnetic circuit. Thus, in order to improve the cross-axial stiffness of the rotor, the stiffness preventing the rotor from rotating around the axis perpendicular to the rotating axis of the rotor, the diameter of the magnetic bearings must be decreased and/or the distance between the rotor and each magnetic bearing along the rotating axis of the rotor must be increased. When the diameter of the magnetic bearings is decreased to improve the cross-axial stiffness of the rotor, the mass of the rotary side of the magnetic bearings cannot be effectively reflected upon the angular momentum of a rotary section (mainly the rotor) of the flywheel apparatus. As a result, the angular momentum of the rotary section of the flywheel apparatus per unit weight becomes, by necessity, small. On the other hand, if the distance between the rotor and the magnetic bearings along the rotating axis of the rotor is increased for the same reason as described above, the size of the apparatus along the rotating axis of the rotor is increased, and the overall flywheel apparatus becomes bulky. Such a bulky flywheel apparatus is not suitable for installation in a satellite.

SUMMARY OF THE INVENTION

It is an object of the present invention to provide a flywheel apparatus which is compact in size and light in weight, in which both the cross-axial stiffness of a rotor, and the angular momentum of the rotary section of the apparatus per unit weight thereof can be increased.

In order to achieve the above object of the present invention, there is provided a flywheel apparatus of magnetic bearing type comprising:

a base having a central axis;

a rotor arranged to be rotatable around the central axis of the base;

a magnetic bearing device which is interposed between the rotor and the base to support the rotor, the magnetic bearing device including:

a first annular plate member of a magnetic material mounted on the base to be coaxial with the central axis of the base, a second annular plate member of a magnetic material mounted on the rotor to be coaxial therewith and opposite of the first annular plate member along a radial direction of the apparatus, the first and second annular plate members defining a first annular gap therebetween substantially concentric with the rotor, and magnetic circuit means having at least two closed magnetic circuits between the first and second annular plate members and having the first annular gap as a common magnetic path, the magnetic circuit means having, at least at the first annular plate member, a pair of first annular permanent magnets arranged to sandwich the first annular plate member, the first annular permanent magnets being magnetized in opposite directions along the axial direction of said rotor;

magnetic flux varying means for varying the density of the magnetic fluxes passing through the common magnetic path at a plurality of positions along a circumferential direction of the first annular gap;

detecting means for detecting the eccentricity of the axis of the rotor with respect to the central axis of the base along the radial direction of the apparatus; and rotary driving means, interposed between the base and the rotor, for driving the rotation of the rotor around the central axis of the base.

According to the present invention, the rotor is axially supported by a passive magnetic circuit and is radially supported by an active magnetic circuit. For this reason, unlike in the case of a magnetic bearing of the type described above, the cross-axial stiffness of the rotor is improved if the size of the magnetic bearing along the axial direction of the rotor is small and/or if the diameter of the magnetic bearing is great. Thus, if the diameter of the magnetic bearing is increased to satisfy one of these two conditions, the mass of the rotary side of the magnetic bearing can be effectively reflected upon the angular momentum of the rotary section of the flywheel apparatus. In this manner, the cross-axial stiffness of the rotor can be improved, and the angular momentum per unit weight of the rotary section of the flywheel apparatus can be increased. Conversely, if the angular momentum per unit weight of the rotary section of the flywheel apparatus is kept to be the same as that of the conventional apparatus, the size of the rotor and hence the apparatus along the radial direction of the rotor can be reduced.

If the size of the magnetic bearing along the axial direction of the rotor is decreased to satisfy the other condition of improving the cross-axial stiffness of the rotor, the size of the apparatus along this axial direction can also be reduced. As a consequence, the overall flywheel apparatus can be rendered flat and compact in size and becomes suitable for a flywheel type actuator to be installed in a satellite. When the flywheel apparatus is rendered flat and compact in size in this manner, the relative positioning of a plurality of flywheel apparatuses is easy, and the overall flywheel type actuator can be rendered compact in size and light in weight. The stress acting on the portion of the satellite mounted the flywheel type actuator during launching of the satellite can be reduced. Furthermore, since the diameter of the magnetic bearing can be increased, the diameter of other conventional contact-type additional bearings for supporting the rotating shaft of the rotor in an emergency can also be increased. The mechanical strength of the additional bearings can be increased, thus preventing damage to the additional bearings upon launching of the satellite.

Finally, according to the present invention, centering of the rotor with respect to the central axis of the base along the radial direction of the rotor is accomplished by controlling the density of the magnetic fluxes passing through the common magnetic path of the two magnetic circuits. Therefore, any decrease in the cross-axial stiffness of the rotor can be reduced to a minimum when the rotor is centered with the base.

DETAILED DESCRIPTION OF THE PREFERRED EMBODIMENTS

Figure 1:
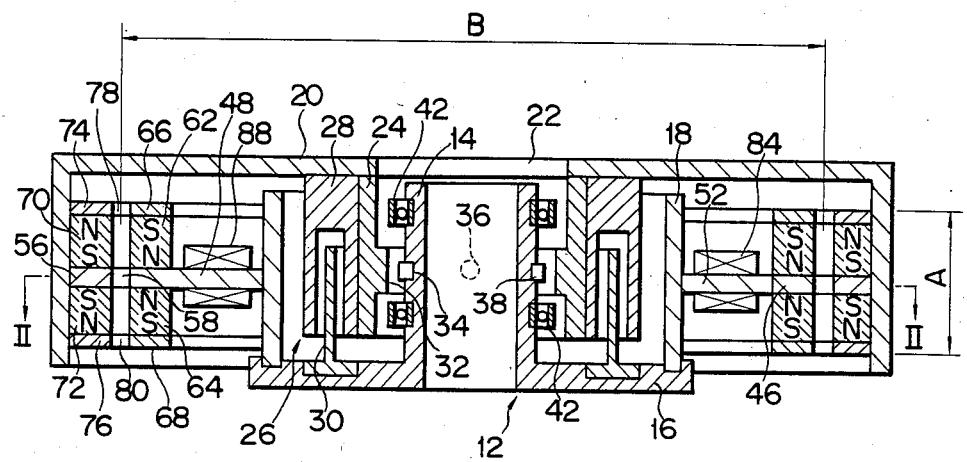
FIG. 1 is a sectional view showing a flywheel apparatus according to an embodiment of the present invention.
Figure 2:
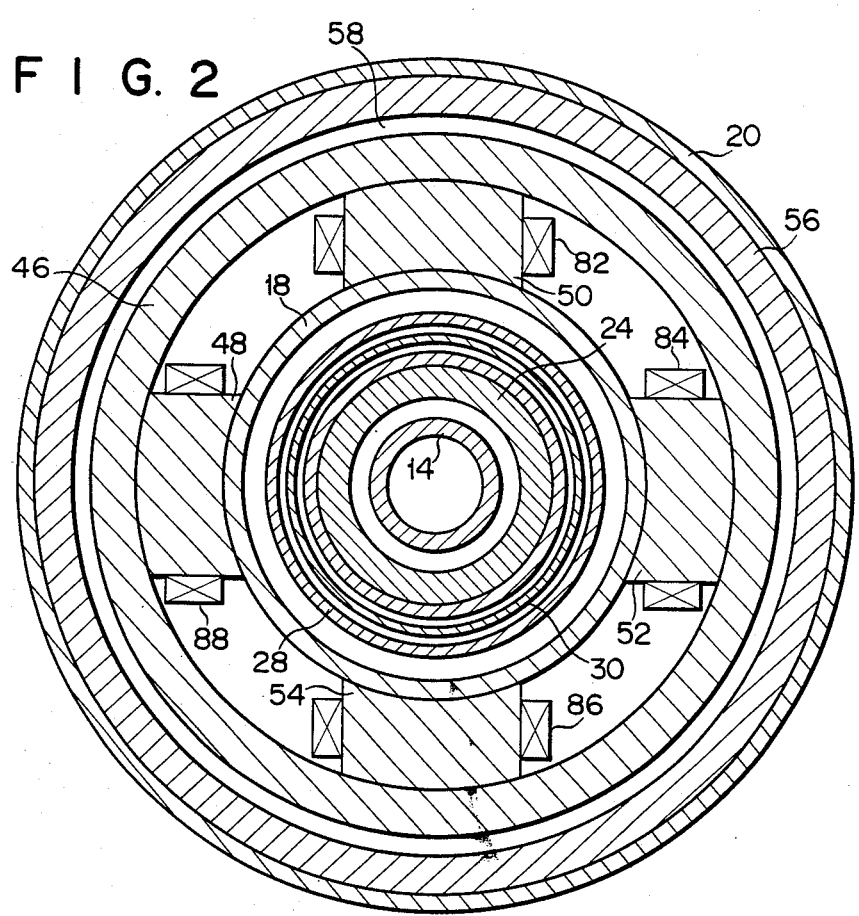
FIG. 2 is a sectional view of the apparatus shown in FIG. 1 along the line II—II therein.
Figure 3:
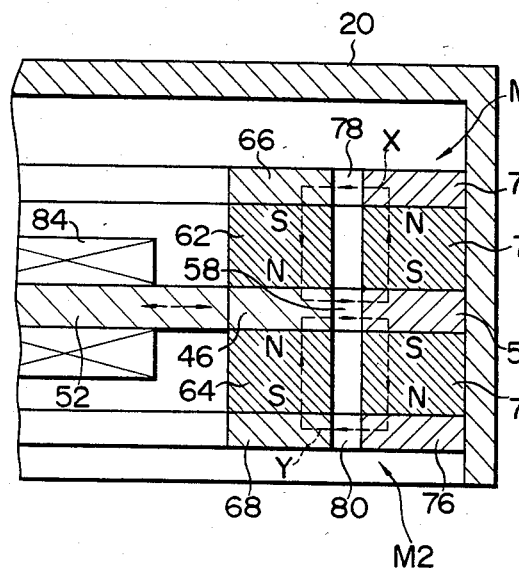
FIG. 3 is an enlarged partial view of the flywheel apparatus shown in FIG. 1.

FIGS. 1 to 3 show a flywheel apparatus according to an embodiment of the present invention. The apparatus has a base 12. The base 12 consists of a hollow inner cylinder 14, a flange 16 formed integrally with the lower portion (FIG. 1) of the cylinder 14, and an outer cylinder 18 of a magnetic material which concentrically surrounds the inner cylinder 14 and has one end (lower end in FIG. 1) fixed to the upper outer periphery of the flange 16. A rotor 20 of a nonmagnetic material is arranged radially outwardly of the base 12 so as to be rotatable around the central axis of the base 12 through a magnetic bearing to be described later. As shown in FIG. 1, the rotor 20 has a flat hollow cylindrical shape having an open lower end which covers the base 12 substantially coaxially with the central axis of the base 12. A hole 22 having a larger diameter than that of the inner cylinder 14 of the base 12 is formed at the center of the upper end of the rotor 20 opposite to its open end so as to be coaxial with the axis or central axis of the inner cylinder 14.

A support cylinder 24 is fixed to the inner side wall of the rotor 20 so as to be coaxial therewith. The support cylinder 24 has an inner diameter equal to the diameter of the hole 22 of the rotor 20 and extends toward the flange 16 of the base 12 and between the inner and outer cylinders 14 and 18 of the base 12.

A brushless motor 26 is arranged between the inner side wall of the rotor 20 and the flange 16 of the base 12. The brushless motor 26 comprises a rotor 28 having an annular groove, the rotor 28 being fixed to the outer circumferential surface of the support cylinder 24, and a stator 30 received in the groove of the rotor 28, the stator 30 being fixed to the flange 16 of the base 12. The power supply terminal of the stator 30 is electrically connected to the output terminal of a power supply device (not shown).

A projecting ring 32 is formed on the inner circumferential wall of the support cylinder 24 at a position halfway along the axial direction. The ring 32 reduces the inner diameter of the support cylinder 24. Displacement sensors 34, 36, 38 and 40 are formed at equal intervals on the outer circumferential surface of the inner cylinder 14 which is opposite of the ring 32 of the support cylinder 24. The sensor 40 is not shown in FIG. 1. The sensors 34, 36, 38 and 40 comprise, for example, distance measuring sensors of an eddy current type and produce distance outputs respectively corresponding to the distance between the ring 32 of the support cylinder 24 and the outer circumferential surface of the inner cylinder 14 of the base 12. If the sensors 34, 36, 38 and 40 are of the eddy current type, the ring 32 of the support cylinder 24 consists of a magnetic material.

A pair of ball bearings 42 are arranged between the outer circumferential surface of the inner cylinder 14 of the base 12 and the inner circumferential surface of the support cylinder 24 so as to be located above and below the sensors 34, 36, 38 and 40. The inner rings of the ball bearings 42 are fixed to the outer circumferential surface of the inner cylinder 14 of the base 12, so that the ball bearings 42 can mechanically support the rotor 20 in an emergency or the like.

A magnetic bearing will now be described in detail. The magnetic bearing has a first annular plate 46 of a magnetic material housed in the rotor 20 to be coaxial with the central axis of the base 12. The first annular plate 46 is magnetically and mechanically coupled to the outer cylinder 18 of the base 12 through four arms 48, 50, 52 and 54 of a magnetic material. The arms 48, 50, 52 and 54 are arranged along the circumferential direction of the outer cylinder 18. A second annular plate 56 of magnetic material and of the same thickness as that of the first annular plate 46 is fixed to the inner circumferential wall of the rotor 20 coaxially therewith. Thus, the first and second annular plates 46 and 56 are opposite to each other along the radial direction. A first annular gap 58 is defined between the first and second annular plates 46 and 56. It is to be noted that the first and second annular plates 46 and 56, the ring 32 of the support cylinder 24, and the sensors 34, 36, 38 and 40 are arranged on a single plane.

A magnetic circuit section is arranged between the first and second annular plates 46 and 56 and forms two magnetic circuits along the central axis of the base 12 which have the first annular gap 58 as a common magnetic path. The magnetic circuit section has a pair of first annular permanent magnets 62 and 64 fixed on the annular surfaces of the first annular plate 46. The first annular permanent magnets 62 and 64 are magnetized to have poles N and S in FIG. 1. Thus, the first annular permanent magnets 62 and 64 are magnetized in opposite directions. A pair of first yokes 66 and 68 of an annular plate shape are fixed on the first annular permanent magnets 62 and 64, respectively. It is to be noted here that the inner and outer circumferential surfaces of the first annular permanent magnets 62 and 64 and the first yokes 66 and 68 are level with the inner and outer circumferential surfaces of the first annular plate 46.

A pair of second annular permanent magnets 70 and 72 are fixed on the annular surfaces of the second annular plate 56 of the rotor 20. The second annular permanent magnets 70 and 72 have the same axial dimension as that of the first annular permanent magnets 62 and 64. The second annular permanent magnets 70 and 72 are magnetized to have poles N and S shown in FIG. 1. Thus, the second annular permanent magnets 70 and 72 are also magnetized along opposite directions. Furthermore, the magnetization direction of the second annular permanent magnets 70 and 72 is opposite to that of the first annular permanent magnets 62 and 64 radially opposing them. A pair of second yokes 74 and 76 of annular plate shape is fixed on the second annular permanent magnets 70 and 72, respectively. The second yokes 74 and 76 are opposite to the first yokes 66 and 68 along the radial direction. The paired yokes 66 and 74 define a second annular gap 78 therebetween, and the paired yokes 68 and 76 define a third annular gap 80 therebetween. Note that the inner circumferential surfaces of the second annular permanent magnets 70 and 72 and of the second yokes 74 and 76 are level with the inner circumferential surface of the second annular plate 56.

Thus, the magnetic circuit section has magnetic circuits M1 and M2 of magnetic paths X and Y, respectively, shown in FIG. 3. The magnetic circuit M1 is defined by the first annular permanent magnet 62, the first annular plate 46, the first annular gap 58, the second annular plate 56, the second annular permanent magnet 70, the second yoke 74, the second annular gap 78, and the first yoke 66. The magnetic circuit M2 is defined by the first annular permanent magnet 64, the first annular plate 46, the first annular gap 58, the second annular plate 56, the second annular permanent magnet 72, the second yoke 76, the third annular gap 80, and the first yoke 68. When these magnetic circuits M1 and M2 are formed, a magnetic attraction exists between the first and second yokes 66 and 74, between the first and second annular plates 46 and 56, and between the first and second yokes 68 and 76. When these attraction forces are preset properly, they can axially support rotor 20. In other words, the rotor 20 is axially supported by the passive magnetic circuits M1 and M2 with respect to the base 12 in a noncontact state, so that axial displacement of the rotor 20 is completely prevented.

The density of the magnetic fluxes passing along the common magnetic path of the magnetic circuits M1 and M2, that is, the first annular gap 58, can be controlled at a plurality of positions along the circumferential direction of the first annular gap 56 by a magnetic flux density varying device. The magnetic flux density varying device has solenoids 82, 84, 86 and 88 wound around the magnetic arms 48, 50, 52 and 54, respectively. Power supply terminals (not shown) of the solenoids 82, 84, 86 and 88 are electrically connected to a power supply control circuit (not shown) of a known zero power control scheme. The power supply control circuit controls the power supplied to the solenoids 82, 84, 86 and 88 in cooperation with the displacement sensors 34, 36, 38 and 40. This will be described in more detail below. When the gap length of the first annular gap 58 between the first and second annular plates 46 and 56 is decreased at a certain position along the circumferential direction, the gap length of the first annular gap 58 at a position 180° shifted from this position is increased. This irregularity in the gap distance of the first annular gap 58 appears as a change in the outputs in the sensors 34, 36, 38 and 40. Based on such a change in the outputs from the sensors 34, 36, 38 and 40, the magnetic flux density of the first magnetic gap 58 at such a narrowed position is decreased by controlling the solenoid near this narrowed position. Conversely, where the gap length of the first annular gap 58 increases at a certain position, the magnetic flux density of the first annular gap 58 at such an extended position is increased by the solenoid near this position. Thereafter, when the gap length of the first annular gap 58 becomes uniform including the narrowed and extended positions, the power supplied to the solenoid 82, 84, 86 and 88 is stopped. According to this power supply control circuit, the gap length of the first annular gap 58 is kept uniform along the circumferential direction, so that the rotor 20 can be easily centered with the base 12 in a stable manner. In other words, the rotor 20 is radially supported with respect to the base 12 in a noncontact manner by a plurality of active magnetic circuits defined by the arms 48, 50, 52 and 54, and the first and second annular plates 46 and 56.

In this manner, the rotor 20 is supported with respect to the base 12 both axially and radially by the passive magnetic circuits M1 and M2 and the active magnetic circuits. When the rotor 20 is driven by the brushless motor 26 in this state, the rotor 20 is kept in a completely noncontact state and is rotated around the central axis of the base 12, so that the flywheel apparatus can function well.

The cross-axial stiffness $K\theta$ of the rotor 20 of the flywheel apparatus described above is known to be given by:

$$K\theta = (\tfrac{1}{2}) \cdot Kr(B^2 - (Ku \cdot A^2)/(2 \cdot Kr))$$

wherein
  Kr: stiffness of the rotor along the radial direction,
  A: axial size of the magnetic bearing,
  B: diameter of the magnetic bearing, and
  Ku: unbalanced stiffness along the axial direction of the rotor.

As can be seen from this relation, the value of A can be decreased and/or the value of B can be increased in order to improve the stiffness $K\theta$ of the rotor 20. If the magnetic bearing 44 is arranged near the outer circumferential wall of the rotor 20 as in the flywheel apparatus of the present invention, the diameter B of the magnetic bearing 44 can be increased, and $K\theta$ can thus be increased. When the diameter B of the magnetic bearing 44 is great, as in this case, the mass of the rotary side (the second annular permanent magnets 70 and 72, the second yokes 74 and 76 and the second annular plate 56) of the magnetic bearing 44 can be effectively used for increasing the angular momentum of the rotor 20 as compared to a conventional apparatus of the same type. If the angular momentum of the rotor 20 is the same as that in a conventional apparatus, the diameter of the rotor 20 and hence the flywheel apparatus can be rendered small.

Meanwhile, the value of A can be decreased to increase $K\theta$. In this case, $K\theta$ can be increased while at the same time the axial size of the flywheel apparatus can be decreased. Therefore, the flywheel apparatus can be rendered flat.

The present invention is not limited to the flywheel apparatus of the embodiment described above. FIGS. 4 to 10 show parts of flywheel apparatuses according to other embodiments of the present invention. The same reference numerals as in FIGS. 1 to 3 denote the same parts in FIGS. 4 to 10, and a detailed description thereof will be omitted. Only those features of these other embodiments which are different from the first embodiment described above will be described below.

Figure 4:
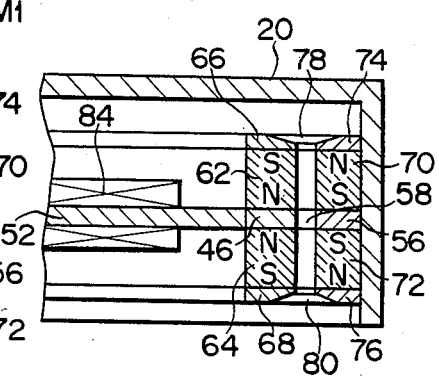
FIGS. 4 to 10 are partial sectional views of flywheel apparatuses according to other embodiments of the present invention.

Referring to FIG. 4, the radially opposing peripheries of the paired yokes 66 and 74 and of paired yokes 68 and 76 are thinner than the other peripheries thereof. With this construction, the magnetic fluxes passing through the second and third annular gaps 78 and 80 can be saturated at a higher density than those magnetic fluxes passing through the first annular gap 58. As a result, the ratio Ku/Kr can be rendered smaller and the value of $K\theta$ can be increased further.

Figure 5:
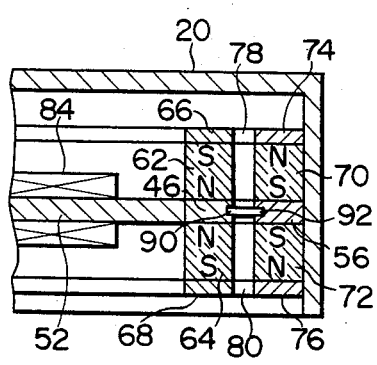

Referring to FIG. 5, the radially opposing end surfaces of the first and second annular plates 46 and 56 have annular grooves 90 and 92, respectively. Then, the value of Ku in the above relation can be decreased, and the value of $K\theta$ can also be increased.

Figure 6:
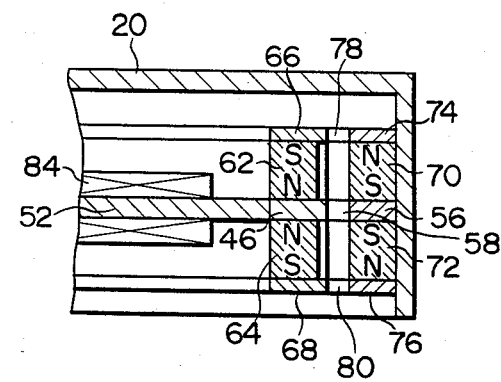

Referring to FIG. 6, the outer circumferential surfaces of the first yokes 66 and 68 and the first annular plate 46 extend radially outward from the outer circumferential surfaces of the first annular permanent magnets 62 and 64. Then, the magnetix fluxes passing through the first to third annular gaps 58, 78 and 80 can be concentrated on the outer circumferential surfaces of the first yokes 66 and 68.

Figure 7:
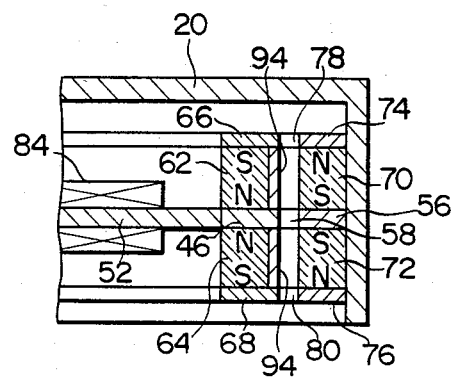

Referring to FIG. 7, thin rings 94 having conductivity and elasticity as electromagnetic dampers are arranged between the outer peripheries of the first yoke 66 and the first annular plate 46 and between the outer peripheries of the first annular plate 46 and the first yoke 68, respectively, so as to cover the outer circumferential surfaces of the first annular permanent magnets 62 and 64. Then, the axial vibration transmitted from the base 12 can be absorbed by the rings 94. The rotary side elements 56, 70, 72, 74 and 76 of the magnetic bearing 44 can alternatively be mounted on the rotor 20 through buffer members, so as to absorb the axial vibration of the base 12 which may be transmitted to the rotor 20.

Figure 8:
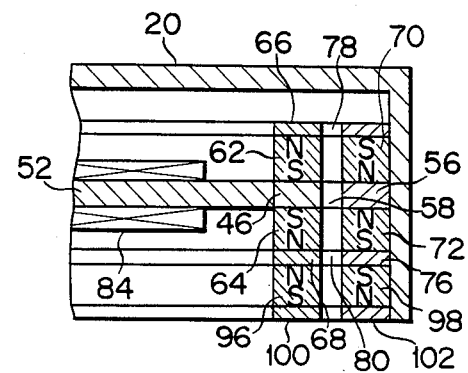

Referring to FIG. 8, third and fourth annular permanent magnets 96 and 98, and third and fourth annular yokes 100 and 102 which together constitute a third magnetic circuit M3 are arranged below the first and second yokes 68 and 76. The same effect as that in the above embodiments can be obtained when three magnetic circuits M1, M2 and M3 are arranged in this manner.

Figure 9:
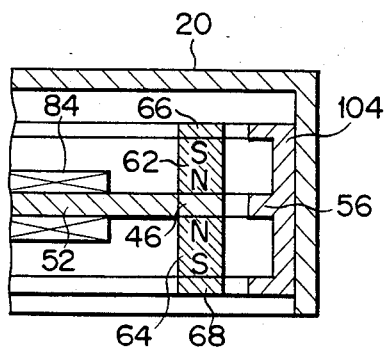

Referring to FIG. 9, the second annular permanent magnets 70 and 72 and the second yokes 74 and 76 are omitted. Instead, a third annular yoke 104 is formed integrally with the second annular plate 56. The third annular yoke 104 extends vertically from the upper and lower surfaces of the outer periphery of the second annular plate 56. The upper and lower ends of the third annular yoke 104 radially oppose the first yokes 66 and 68. Then, two magnetic circuits similar to the magnetic circuits M1 and M2 can be formed.

Figure 10:
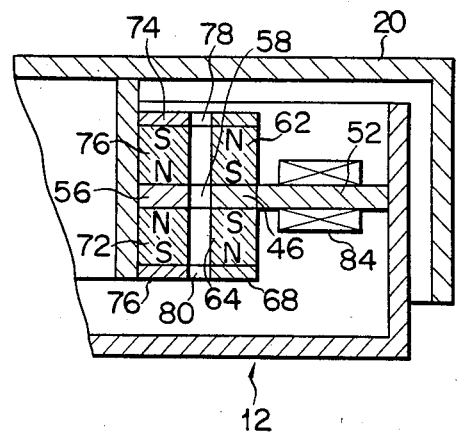

Finally, in FIG. 10, the rotary side elements of the magnetic bearing 44 are arranged radially inwardly of the stationary side elements thereof.

In order to provide a still stabler radial support of the rotor 20, the first annular plate 46 can be circumferentially divided into sections to define gaps therebetween, or a plurality of notches can be formed along the circumferential direction of the first annular plate 46. Alternatively, the first annular plate 46 can consist of rings which are stacked in the radial direction.

What is claimed is:

1. A flywheel appartus of magnetic bearing type comprising:
   a base having a central axis;
   a rotor arranged to be rotatable around the central axis of the base;
   a magnetic bearing device which is interposed between the rotor and the base to support the rotor, said magnetic bearing device including:
   a first annular plate member of a magnetic material mounted on the base to be coaxial with the central axis of the base,
   a second annular plate member of a magnetic material mounted on the rotor to be coaxial therewith and opposite of the first annular plate member along a radial direction of the apparatus, the first and second annular plate members defining a first annular gap therebetween substantially concentric with the rotor, and
   magnetic circuit means having at least two closed magnetic circuits between the first and second annular plate members and having the first annular gap as a common magnetic path, the magnetic circuit means having, at least at the first annular plate member, a pair of first annular permanent magnets arranged to sandwich the first annular plate member, the first annular permanent magnets being magnetized in opposite directions along the axial direction of said rotor;
   magnetic flux varying means for varying the density of the magnetic fluxes passing through the common magnetic path at a plurality of positions along a circumferential direction of the first annular gap;
   detecting means associated with said base and rotor for detecting the eccentricity of the axis of the rotor with respect to the central axis of the base along the radial direction of the apparatus; and
   rotary driving means, interposed between the base and the rotor, for driving a rotation of the rotor around the central axis of the base.

2. An appartus according to claim 1, wherein the magnetic circuit means further includes a pair of second annular permanent magnets mounted on the second annular plate member to sandwich the second annular plate member, the second annular permanent magnets being magnetized along the axial direction of the rotor, and each of the second annular permanent magnets and a radially opposing one of the first annular permanent magnets being magnetized in opposite directions; first yokes of an annular plate shape mounted on the first annular permanent magnets to sandwich the first annular permanent magnets with the first annular plate member; and second yokes of an annular plate shape mounted on the second annular permanent magnets to sandwich the second annular permanent magnets together with the second annular plate member, pairs of the first and second yokes being formed, such that the pairs of the first and second yokes are radially opposed to each other to define second and third annular gaps between the pairs.

3. An apparatus according to claim 2, wherein an area of one of radially opposing end surfaces of the pairs is smaller than an area of the other end surface of the pairs.

4. An apparatus according to claim 2, wherein radially opposing circumferential surfaces of the first and second annular plate members have annular grooves, respectively.

5. An apparatus according to claim 2, wherein a circumferential surface of the first annular plate member which opposes the second annular plate member, a circumferential surface of each of the first annular permanent magnets which opposes one of the second annular permanent magnets, and a circumferential surface of each of the first yokes which opposes one of the second yokes are arranged on a single circumferential plane having the central axis of said base as a center.

6. An apparatus according to claim 2, wherein circumferential surfaces of the first annular permanent magnets which are opposite to the second annular permanent magnets are arranged on a single circumferential plane having the central axis of said base as a center, and a circumferential surface of the first annular plate member opposite to the second annular plate member and circumferential surfaces of the first yokes opposite to the second yokes are projected outward toward corresponding ones of the second annular plate member and the second yokes.

7. An apparatus according to claim 6, wherein thin conductive rings covering circumferential surfaces of the first annular permanent magnets are arranged between an annular projection of the first annular plate member projecting beyond circumferential surfaces of the first annular permanent magnets and annular projections of the first yokes projecting beyond circumferential surfaces of the first annular permanent magnets.

8. An apparatus according to claim 2, wherein the magnetic circuit means further includes third and fourth annular permanent magnets respectively mounted on one of the first yokes and one of the second yokes paired therewith, the third annular permanent magnet being magnetized in the same direction as that of the other of the first yokes, or the fourth annular permanent magnet being magnetized in the same direction as that of the other of the second yokes; and third and fourth yokes of annular plate shape mounted on the third and fourth annular permanent magnets so as to sandwich the third and fourth annular permanent magnets between one of the first yokes and one of the second yokes, the third and fourth yokes being radially opposed each other to define a fourth annular gap therebetween.

9. An apparatus according to claim 1, wherein the magnetic circuit means further includes first yokes of annular plate shape mounted on the first annular permanent magnets, respectively, to sandwich the first annular permanent magnets together with the first annular plate member; and a second yoke which is formed integrally with the second annular plate member to extend in opposite directions therefrom along the axial direction of said rotor, two ends of the second yoke radially opposing the first yokes so as to define second and third annular gaps therebetween.

10. An apparatus according to claim 1, wherein the first annular plate member is arranged radially inwardly of the second annular plate member.

11. An apparatus according to claim 1, wherein the first annular plate member is arranged radially outwardly of the second annular plate member.

12. An apparatus according to claim 1, wherein the first annular plate member and said base are coupled to each other through four arms of magnetic material arranged at equal intervals along a circumferential direction of said apparatus, and said magnetic flux density varying means has solenoids wound around the arms, respectively.

* * * * *